(12) United States Patent
Tatsumoto et al.

(10) Patent No.: US 11,570,254 B2
(45) Date of Patent: Jan. 31, 2023

(54) SERVER APPARATUS, SYSTEM, IN-VEHICLE APPARATUS, VEHICLE, AND METHOD OF OPERATING A SYSTEM (71) Applicant: Toyota Jidosha Kabushiki Kaisha, Toyota (JP)

(72) Inventors: Yuki Tatsumoto, Nagoya (JP); Toshiki Kashiwakura, Ota-ku Tokyo-to (JP); Akira Sasaki, Miyoshi (JP); Manabu Ishihara, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/388,686

(22) Filed: Jul. 29, 2021

(65) Prior Publication Data
US 2022/0038555 A1 Feb. 3, 2022

(30) Foreign Application Priority Data
Aug. 3, 2020 (JP) .............................. JP2020-132042

(51) Int. Cl.
H04L 67/131 (2022.01)
H04L 67/306 (2022.01)
H04L 67/12 (2022.01)
H04W 4/46 (2018.01)
G06Q 50/30 (2012.01)

(52) U.S. Cl.
CPC ............ *H04L 67/131* (2022.05); *H04L 67/12* (2013.01); *H04L 67/306* (2013.01); *H04W 4/46* (2018.02); *G06Q 50/30* (2013.01)

(58) Field of Classification Search
CPC ..... H04L 67/131; H04L 67/12; H04L 67/306; H04W 4/46; G06Q 50/30
See application file for complete search history.

(56) References Cited

U.S. PATENT DOCUMENTS

| 2014/0128144 A1* | 5/2014 | Bavitz .................. A63F 13/217 463/23 |
| 2017/0316533 A1 | 11/2017 | Goldman-Shenhar et al. |
| 2018/0121828 A1 | 5/2018 | Keysers et al. |
| 2018/0356830 A1* | 12/2018 | Haghighat .......... B60W 50/085 |

FOREIGN PATENT DOCUMENTS

| JP | 2019063325 A | 4/2019 |
| JP | 2019079303 A | 5/2019 |
| WO | 2019136066 A1 | 7/2019 |

* cited by examiner

Primary Examiner — Normin Abedin
(74) Attorney, Agent, or Firm — Dinsmore & Shohl LLP (57) ABSTRACT A server apparatus includes a communication interface and a controller configured to transmit/receive information to/from another apparatus using the communication interface. Upon receiving a request for vehicle dispatch from a terminal apparatus, the controller is configured to transmit an instruction to pick up a user of the terminal apparatus to a vehicle that includes a game apparatus corresponding to a game preference of the user.

11 Claims, 9 Drawing Sheets

SERVER APPARATUS, SYSTEM, IN-VEHICLE APPARATUS, VEHICLE, AND METHOD OF OPERATING A SYSTEM

CROSS-REFERENCE TO RELATED APPLICATION

This application claims priority to Japanese Patent Application No. 2020-132042, filed Aug. 3, 2020, the entire contents of which are incorporated herein by reference.

TECHNICAL FIELD

The present disclosure relates to a server apparatus, a system, an in-vehicle apparatus, a vehicle, and a method of operating a system.

BACKGROUND

Various technologies have been proposed for users to play games in a network environment. Examples of online games, such as executing a game program, distributed from a server, on a terminal apparatus or executing a game program on a plurality of game machines that can communicate via a network for a plurality of user compete against each other, are disclosed in patent literature (PTL) 1 and 2.

CITATION LIST

Patent Literature

PTL 1: JP 2019-79303 A
PTL 2: WO2019136066

SUMMARY

There is room for improvement in the convenience for a user with a preference for games.

A server apparatus according to the present disclosure includes a communication interface and a controller configured to transmit/receive information to/from another apparatus using the communication interface. Upon receiving a request for vehicle dispatch from a terminal apparatus, the controller is configured to transmit an instruction to pick up a user of the terminal apparatus to a vehicle that includes a game apparatus corresponding to a game preference of the user.

An in-vehicle apparatus according to the present disclosure is an in-vehicle apparatus to be mounted in a vehicle that includes a game apparatus. The in-vehicle apparatus includes a communication interface and a controller configured to transmit/receive information to/from another apparatus using the communication interface. The controller is configured to receive, from a server apparatus configured to receive a request for vehicle dispatch from a terminal apparatus, an instruction to pick up a user of the terminal apparatus when a game preference of the user corresponds to the game apparatus.

A method of operating a system according to the present disclosure is a method of operating a system that includes a server apparatus and a vehicle provided with a game apparatus, the server apparatus and the game apparatus being configured transmit/receive information to/from each other. The method includes receiving, by the server apparatus, a request for vehicle dispatch from a terminal apparatus and transmitting an instruction to pick up a user of the terminal apparatus when a game preference of the user corresponds to the game apparatus, and receiving, by the vehicle, the instruction.

According to the present disclosure, the convenience for a user with a preference for games can be improved.

DETAILED DESCRIPTION

Embodiments are described below.

Figure 1:
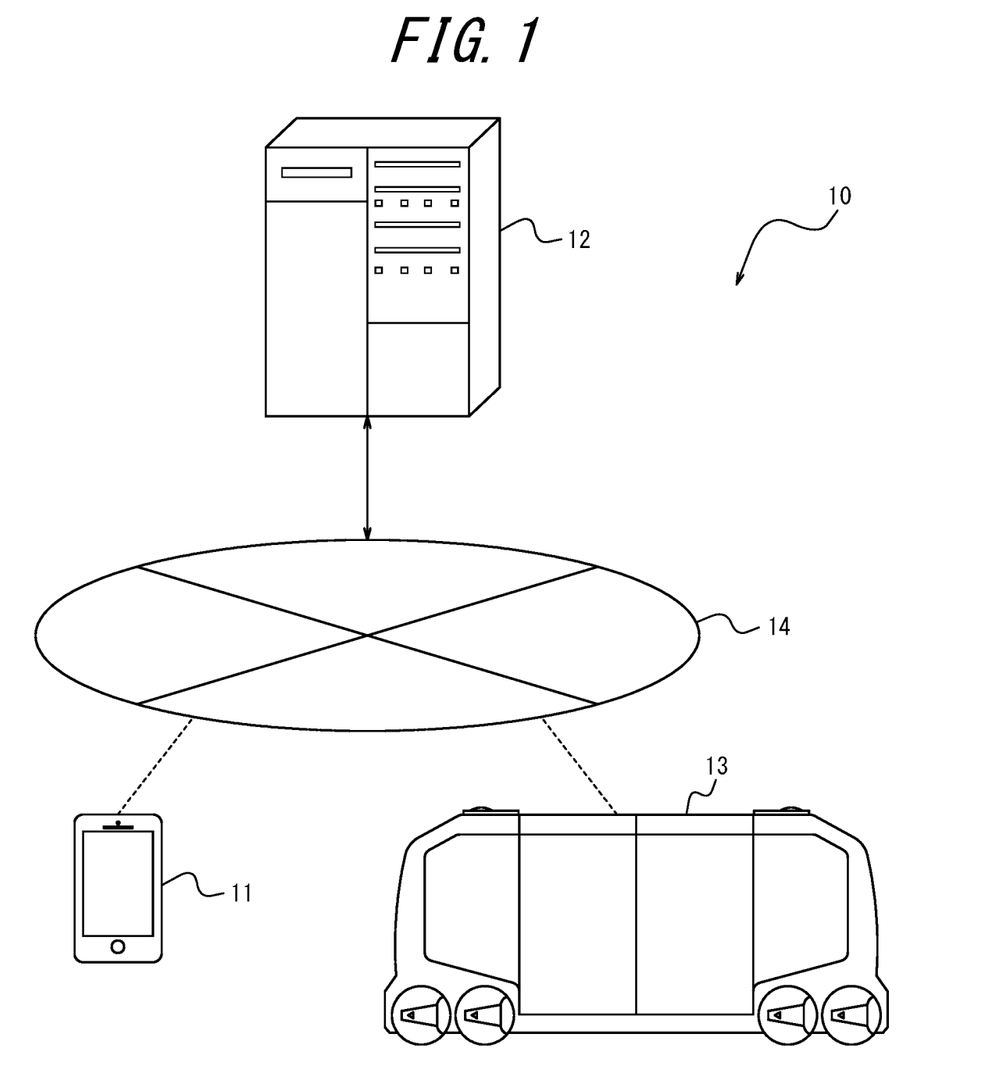
FIG. 1 is a diagram illustrating a configuration example of an information system.

FIG. 1 is a diagram illustrating an example configuration of an information system in an embodiment. An information system 10 contributes to convenience when a user with a preference for games uses a vehicle dispatch service. The information system 10 includes a terminal apparatus 11, a server apparatus 12, and a vehicle 13 that are communicatively connected to each other via a network 14. The terminal apparatus 11 is an information processing terminal having a communication function and a game function and may, for example, be a mobile phone, a smartphone, a tablet, a personal computer (PC), or the like. The server apparatus 12 is, for example, a server apparatus belonging to a cloud computing system or other computing system and implements various functions. The vehicle 13 is a multi-purpose vehicle, operated manually or autonomously, which is provided for a dispatch service and is equipped with a game apparatus. The network 14 may, for example, be the Internet or may include an ad hoc network, a Local Area Network (LAN), a metropolitan area network (MAN), other networks, or any combination thereof.

In the present embodiment, the server apparatus 12 receives a request for vehicle dispatch from the terminal apparatus 11 used by the user and transmits an instruction to pick up the user of the terminal apparatus 11 to a vehicle 13 that includes a game apparatus corresponding to a game preference of the user. The vehicle 13 picks up the user in response to the instruction. The user can play a game that matches the user's preference while traveling in the vehicle 13, enabling efficient use of travel time. Therefore, the convenience of a user with a preference for games can be improved.

Figure 2:
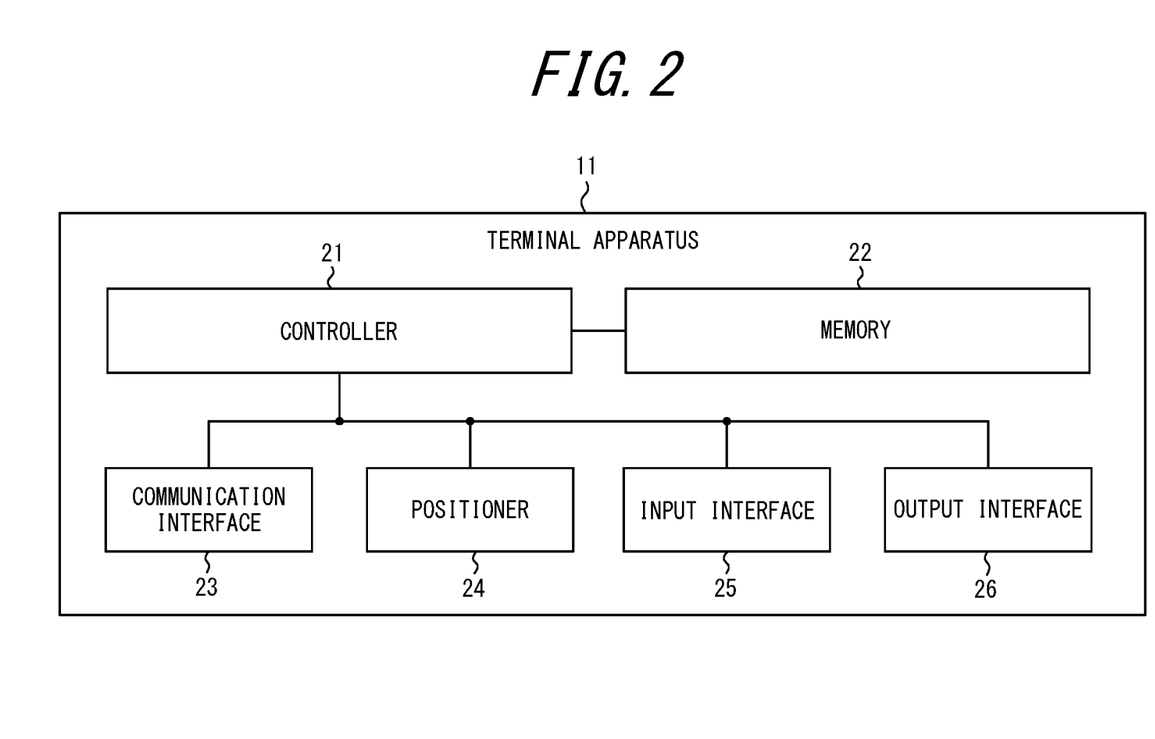
FIG. 2 is a diagram illustrating a configuration example of a terminal apparatus.

FIG. 2 is a diagram illustrating a configuration example of the terminal apparatus 11. The terminal apparatus 11 includes a controller 21, a memory 22, a communication interface 23, a positioner 24, an input interface 25, and an output interface 26. The terminal apparatus 11 is an information processing apparatus having a communication function and a game function and is, for example, a cellular phone, a smartphone, a tablet, a PC, or the like. Users play games and use the vehicle dispatch service via the terminal apparatus 11. Alternatively, the terminal apparatus 11 may be a home game machine having a game function and may share execution of operations in the present embodiment with the information processing apparatus. The configuration illustrated here may be applied to either the case of the terminal apparatus 11 being a home game machine or being an information processing terminal.

The controller 21 includes one or more processors, one or more dedicated circuits, or a combination thereof. Examples of the processor include a general-purpose processor such as a central processing unit (CPU) and a dedicated processor dedicated to specific processing. Examples of dedicated circuits may include a Field-Programmable Gate Array (FPGA) and an Application Specific Integrated Circuit (ASIC). The controller 21 controls each component of the terminal apparatus 11 to process information related to the operations of the terminal apparatus 11.

The memory 22 includes one or more semiconductor memories, one or more magnetic memories, one or more optical memories, or a combination of at least two of these. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 22 functions as, for example, a main memory, an auxiliary memory, or a cache memory. The memory 22 stores information used in the operation of the terminal apparatus 11 and information resulting from operations of the terminal apparatus 11.

The communication interface 23 includes at least one interface for communication. Examples of the interface for communication include an interface corresponding to mobile communication standards, such as Long Term Evolution (LTE), 4th Generation (4G), or 5th Generation (5G), or a LAN interface. The communication interface 23 receives information for use in operations of the terminal apparatus 11 and transmits information resulting from operations of the terminal apparatus 11. The terminal apparatus 11 connects to the network 14 via a nearby router apparatus or mobile communication base station using the communication interface 23 and communicates information with other apparatuses via the network 14.

The positioner 24 includes at least one global navigation satellite system (GNSS) receiver. The GNSS includes, for example, at least one of Global Positioning System (GPS), Quasi-Zenith Satellite System (QZSS), BeiDou, Global Navigation Satellite System (GLONASS), and Galileo. The positioner 24 acquires positional information for the terminal apparatus 11.

The input interface 25 includes at least one interface for input. The interface for input is, for example, a physical key, a capacitive key, a pointing device, a touchscreen integrally provided with a display, or a microphone that receives audio input. The interface for input may further include a camera or IC card reader that captures images or image codes. The input interface 25 receives operations for inputting information used in operations of the terminal apparatus 11 and transmits the inputted information to the controller 21.

The output interface 26 includes at least one interface for output. The interface for output may, for example, be an external or built-in display for outputting information as an image or video, a speaker for outputting information as audio, or an interface for connecting with an external output device. The display is, for example, a liquid crystal display (LCD) or an organic electro luminescence (EL) display. The output interface 26 outputs information resulting from operations of the terminal apparatus 11.

Operations of the terminal apparatus 11 are implemented by the processor included in the controller 21 executing a program. Some or all of the operations of the terminal apparatus 11 may be executed by a dedicated circuit included in the controller 21.

Figure 3:
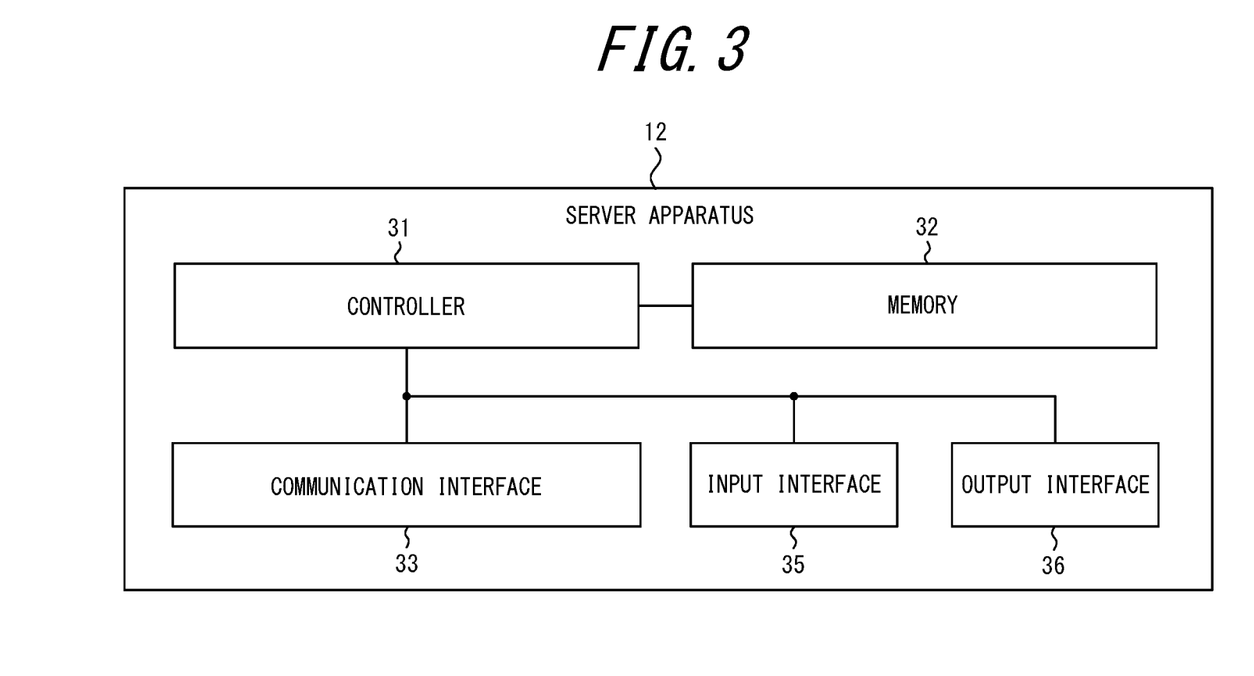
FIG. 3 is a diagram illustrating a configuration example of a server apparatus.

FIG. 3 is a diagram illustrating a configuration example of the server apparatus 12. The server apparatus 12 includes a controller 31, a memory 32, a communication interface 33, an input interface 35, and an output interface 36. The server apparatus 12 is, for example, a server computer that belongs to a cloud computing system or other computing system and functions as a server that implements various functions. The server apparatus 12 may be one server computer or a plurality of interconnected server computers that can communicate information to operate in conjunction with each other.

The controller 31 includes one or more processors, one or more dedicated circuits, or a combination thereof. Examples of the processor include a general-purpose processor, such as a CPU, and a dedicated processor dedicated to specific processing, such as a Graphics Processing Unit (GPU). The dedicated circuit is, for example, an FPGA or an ASIC. The controller 31 controls each component of the server apparatus 12 to process information related to the operations of the server apparatus 12.

The memory 32 includes, for example, one or more semiconductor memories, one or more magnetic memories, one or more optical memories, or a combination of at least two of these, that serve as a main storage, an auxiliary storage, or a cache memory. The semiconductor memory is, for example, RAM or ROM. The RAM is, for example, SRAM or DRAM. The ROM is, for example, EEPROM. The memory 32 stores information used in the operation of the server apparatus 12 and information resulting from operations of the server apparatus 12.

In the server apparatus 12, the controller 31 and the memory 32 may be connected via a bus or may be directly connected to each other without use of a bus. Alternatively, the controller 31 may contain the memory 32 and be configured integrally with the memory 32.

The communication interface 33 includes at least one interface for communication. The interface for communication is, for example, a LAN interface. The communication interface 33 receives information for use in operations of the server apparatus 12 and transmits information resulting from operations of the server apparatus 12. The server apparatus 12 connects to the network 14 via the communication interface 33 and communicates information with other apparatuses via the network 14.

The input interface 35 includes at least one interface for input. The interface for input is, for example, a physical key, a capacitive key, a pointing device, a touchscreen integrally provided with a display, or a microphone that receives audio input. The interface for input may further include a camera or IC card reader that captures images or image codes. The input interface 35 receives operations for inputting information used in operations of the server apparatus 12 and transmits the inputted information to the controller 31.

The output interface 36 includes at least one interface for output. The interface for output is, for example, a display or a speaker. The display is, for example, an LCD or an organic EL display. The output interface 36 outputs information resulting from operations of the server apparatus 12.

The functions of the server apparatus 12 are realized by execution of a control program by a processor included in the controller 31. The control program is a program for causing a computer to implement functions corresponding to the processing of steps included in the operations of the server apparatus 12 by causing the computer to execute the processing of the steps. In other words, the control program is a program for causing a computer to function as the server apparatus 12. Some or all of the functions of the server apparatus 12 may be implemented by a dedicated circuit included in the controller 31.

Figure 4:
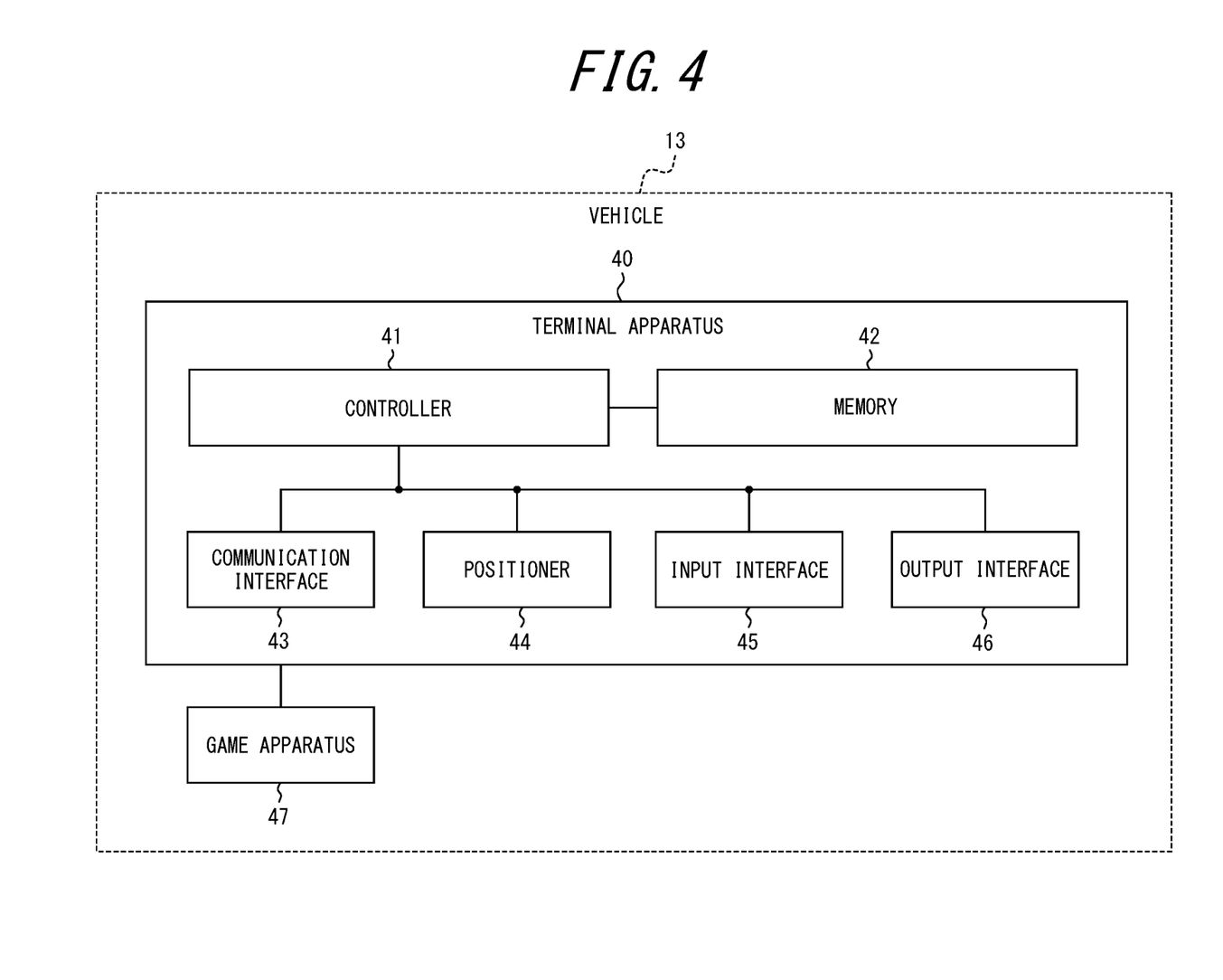
FIG. 4 is a diagram illustrating a configuration example of a vehicle.

FIG. 4 is a diagram illustrating an example configuration of an in-vehicle apparatus 40 mounted in the vehicle 13. The in-vehicle apparatus 40 includes a controller 41, a memory 42, a communication interface 43, a positioner 44, an input interface 45, and an output interface 46. A game apparatus 47, controlled by the in-vehicle apparatus 40, is also mounted in the vehicle 13. The in-vehicle apparatus 40 controls the vehicle 13 by executing operations according to the present embodiment.

The controller 41 includes one or more processors, one or more dedicated circuits, or a combination thereof. Examples of the processor include a general-purpose processor such as a CPU and a dedicated processor dedicated to specific processing. The dedicated circuit is, for example, an FPGA or an ASIC. The controller 41 controls each component of the in-vehicle apparatus 40 to process information related to the operations of the in-vehicle apparatus 40.

The memory 42 includes, for example, one or more semiconductor memories, one or more magnetic memories, one or more optical memories, or a combination of at least two of these, that serve as a main storage, an auxiliary storage, or a cache memory. The semiconductor the memory is, for example, RAM or ROM. The RAM is, for example, SRAM or DRAM. The ROM is, for example, EEPROM. The memory 42 processes information related to operations of the in-vehicle apparatus 40 and stores information used in the operations of the in-vehicle apparatus 40 and information resulting from operations of the in-vehicle apparatus 40.

The communication interface 43 includes at least one interface for communication. Examples of the interface for communication include an interface corresponding to mobile communication standards, such as LTE, 4G, or 5G. The communication interface 43 receives information for use in operations of the in-vehicle apparatus 40 and transmits information resulting from operations of the in-vehicle apparatus 40. The in-vehicle apparatus 40 connects to the network 14 via a mobile communication base station using the communication interface 43 and communicates information with other apparatuses via the network 14.

The positioner 44 includes at least one GNSS receiver. The GNSS includes, for example, GPS, QZSS, BeiDou, GLONASS, and/or Galileo. The positioner 44 acquires positional information for the vehicle 13.

The input interface 45 includes at least one interface for input. The interface for input is, for example, a physical key, a capacitive key, a pointing device, a touchscreen integrally provided with a display, or a microphone that receives audio input. The interface for input may further include a camera or IC card reader that captures images or image codes. The input interface 45 receives operations for inputting information used in operations of the in-vehicle apparatus 40 and transmits the inputted information to the controller 41.

The output interface 46 includes at least one interface for output. The interface for output is, for example, a display or a speaker. The display is, for example, an LCD or an organic EL display. The output interface 46 outputs information resulting from operations of the in-vehicle apparatus 40.

The functions of the in-vehicle apparatus 40 are realized by execution of a control program by a processor included in the controller 41. The control program is a program for causing a computer to implement functions corresponding to the processing of steps included in the operations of the in-vehicle apparatus 40 by causing the computer to execute the processing of the steps. In other words, the control program is a program for causing a computer to function as the in-vehicle apparatus 40. Some or all of the functions of the in-vehicle apparatus 40 may be implemented by a dedicated circuit included in the controller 41.

The game apparatus 47 is installed in the cabin as part of the multipurpose use of the vehicle 13 and provides equipment and space for the user to play a game. The game apparatus 47 includes a memory such as a memory for storing information necessary for the progress of the game, a controller such as a processor for performing information processing necessary for the progress of the game, and an input/output interface of a different type and specification than the terminal apparatus 11 to enable input/output of information in accordance with the progress of the game. The game apparatus 47 provides an environment specialized for the user to play a predetermined game in the vehicle 13. The game apparatus 47 is configured to communicate information with the server apparatus 12 or other servers, another terminal apparatus 11, or the game apparatus 47 of another vehicle 13 via the communication interface 43 to enable the game to be played in cooperation with other apparatuses. The input interface, included in the game apparatus 47, of a different type and specification than the terminal apparatus 11 is, for example, an input apparatus shaped like a steering wheel, joystick, or the like suitable for a game such as a racing game or flight simulator, an input apparatus shaped like a weapon such as a gun or a sword used in a battle-type action game, an input apparatus shaped like a tool such as a bat or a racket used in a sports game, a wearable device that is worn by the user and detects operations by the user as input, or the like. The output interface included in the game apparatus 47 is, for example, a theater device for outputting images, audio, or the like in association with progress of the game, various decorations that express the world view of the game and are driven in accordance with progress of the game, an operation apparatus, wearable device, or seat that includes a drive unit for providing a user with a sensory stimulus such as vibration according to the progress of the game, or the like. According to the game apparatus 47, the user who plays the game can have a realistic, interesting experience that cannot be obtained with the terminal apparatus 11.

Next, operations of the information system 10 are described with reference to FIGS. 5 to 8B. The operations of the terminal apparatus 11 described below may be operations by an information processing terminal that includes a game function and a communication function or may include operations performed by a home game machine and operations by the information processing terminal.

Figure 5:
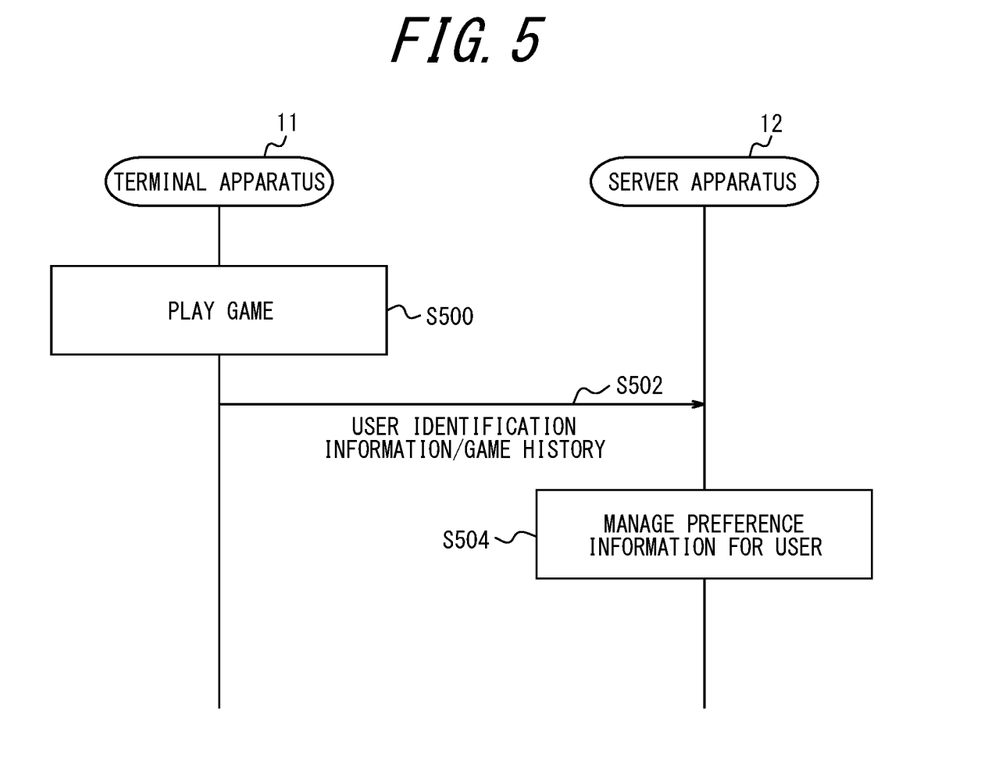
FIG. 5 is a sequence diagram illustrating an operation example of the information system.

FIG. 5 is a sequence diagram illustrating operation procedures when the terminal apparatus 11 and the server apparatus 12 operate in conjunction with each other. The procedures in FIG. 5 are performed when a user plays a game using the terminal apparatus 11.

In step S500, the user plays a game using the terminal apparatus 11. In the memory 22 of the terminal apparatus 11, a program of at least one game that the user prefers is stored in advance or each time the game is played, for example by being downloaded. The controller 21 receives user operations via the input interface 25 while executing the game program stored in the memory 22, advances the game in response to the operations, and outputs information corresponding to progress of the game via the output interface 26.

In step S502, the terminal apparatus 11 transmits user identification information and game history to the server apparatus 12. The user identification information is a user name identifying the user, a password, and the like. The game history includes identification information of the game played on the terminal apparatus 11 and information such as the date and time and the elapsed time of game play. The identification information of the game includes information such as the product name of the game and the developer.

Figure 7:
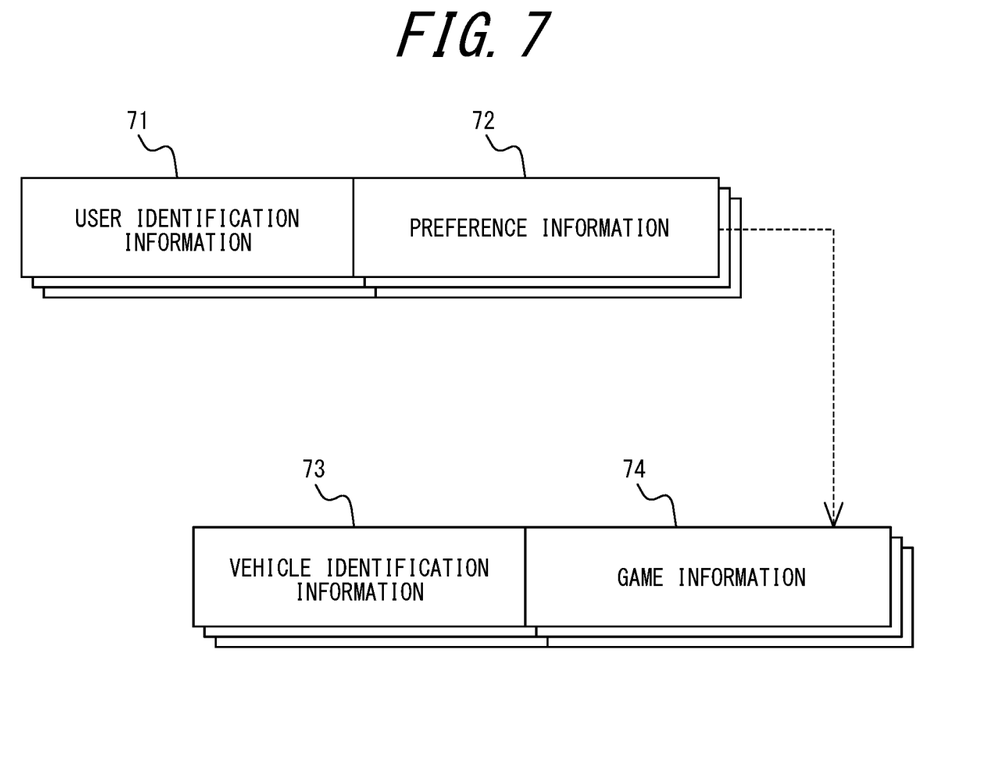
FIG. 7 is a diagram illustrating an example of the information stored in a memory.

In step S504, the server apparatus 12 manages preference information for the user. The preference information includes at least one game type that the user prefers. Examples of game types include action games, role-playing games, puzzle games, simulation games, adventure games, shooting games, sports games, racing games, and music games. Each game type may be further subdivided. Two or more game types may correspond to one game. The controller 31 of the server apparatus 12 stores information classifying commercially available games by game type in the memory 32 in advance, for example. Based on the identification information of the games included in the game history, the controller 31 searches for and identifies game types from the information in the memory 32. The controller 31 then counts the playing time of the user for each game type and ranks the game types by length of total playing time. At this time, the controller 31 may, for example, weight the total playing time using weights corresponding in size to the play frequency of each game type. The controller 31 then stores any appropriate number of higher-order game types, for example, in the memory 32 in association with the identification information of the user as the preference information of the user. Preference information 72 is stored in the memory 32 in association with identification information 71 of the user as illustrated in FIG. 7, for example.

Figure 6:
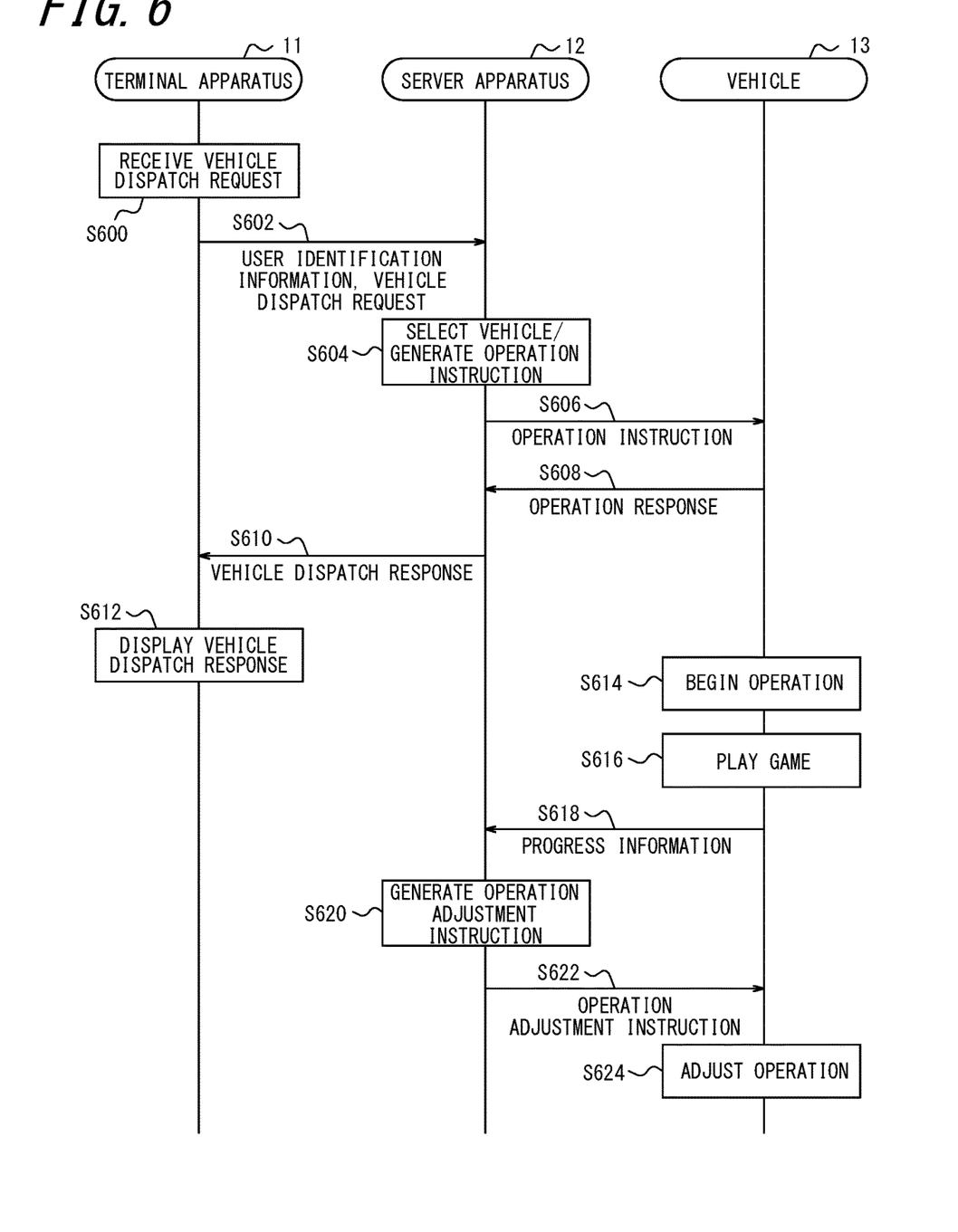
FIG. 6 is a sequence diagram illustrating an operation example of the information system.

FIG. 6 is a sequence diagram illustrating operation procedures when the terminal apparatus 11, the server apparatus 12, and the vehicle 13 operate in conjunction with each other. The procedures in FIG. 6 are executed when the user utilizes a vehicle dispatch service with the terminal apparatus 11.

In step S600, the terminal apparatus 11 receives a vehicle dispatch request from the user. The controller 21 of the terminal apparatus 11 receives user identification information inputted by the user to the input interface 25 when a vehicle dispatch application is launched in response to user operation on the input interface 25, for example. Alternatively, the controller 21 may store user identification information that the user enters once at the beginning of use of the vehicle dispatch application in the memory 22 and subsequently read the user identification information from the memory 22. The controller 21 then receives map information from the server apparatus 12 in accordance with the current position of the terminal apparatus 11 or reads the map information from the memory 22, displays the map information via the output interface 26, and prompts the user to input a boarding point and a drop-off point. The user inputs the boarding point and drop-off point, for example by tapping a desired point on the map or inputting an address, to request vehicle dispatch. The controller 21 then receives the input from the user via the input interface 25.

In step S602, the terminal apparatus 11 transmits the user identification information and vehicle dispatch request to the server apparatus 12. The user identification information is a user name identifying the user, a password, and the like. Together with the user identification information, the controller 21 of the terminal apparatus 11 transmits a vehicle dispatch request that includes information on the boarding point and drop-off point to the server apparatus via the communication interface 23. The controller 31 of the server apparatus 12 receives the user identification information and the vehicle dispatch request via the communication interface 33.

In step S604, the server apparatus 12 selects the vehicle to be dispatched and generates an operation instruction. The controller 31 of the server apparatus 12 selects a vehicle 13 that includes a game apparatus 47 corresponding to the preference of the user and that can be dispatched. Information on vehicles 13 that can provide the vehicle dispatch service is stored in advance in the memory 32. For example, as illustrated in FIG. 7, vehicle identification information 73 for each vehicle 13 and game information 74 related to the game apparatus 47 mounted in each vehicle 13 are stored in association with each other in the memory 32. The game information 74 includes a game type of the game provided by the game apparatus 47. When one game apparatus 47 can provide a plurality of game types, the game information 74 associated with the identification information 71 of one vehicle 13 includes a plurality of game types. The controller 31 retrieves game information 74 that has a game type corresponding to the preference information 72 of the user from the memory 32 and identifies the vehicle identification information 73 associated with the game information 74. The controller 31 then acquires the positional information from the vehicle 13 of the identified vehicle identification information 73 and confirms whether the vehicle 13 is located in a dispatchable area. If more than one vehicle 13 can be dispatched, the controller 31 selects the vehicle 13 closest to the boarding point of the user, for example. Based on the boarding point, drop-off point, and the like of user, the controller 31 then generates an operation instruction for the selected vehicle 13 requesting pickup of the user.

In step S606, the server apparatus 12 transmits the operation instruction to the vehicle 13. The controller 31 of the server apparatus 12 transmits the operation instruction to the vehicle 13 via the communication interface 33. In the vehicle 13, the controller 41 of the in-vehicle apparatus 40 receives the operation instruction via the communication interface 43.

In step S608, the vehicle 13 transmits an operation response to the server apparatus 12 to respond to the operation request. For example, the controller 41 of the in-vehicle apparatus 40 displays the boarding point and the drop-off point included in the operation instruction to the driver via the output interface 46 and receives a response to the operation instruction from the driver via the input interface 45 to generate the operation response. When the vehicle 13 operates autonomously, the controller 41 makes judgments such as whether the vehicle is empty or can be boarded and generates the operation response. The operation response includes an identification number of the vehicle 13, information on the current position, and the like. The controller 41 of the in-vehicle apparatus 40 transmits the operation response to the server apparatus 12 via the communication interface 43. The controller 31 of the server apparatus 12 receives the operation response via the communication interface 33.

In step S610, the server apparatus 12 generates a vehicle dispatch response corresponding to the operation response and transmits the vehicle dispatch response to the terminal apparatus 11. Based on the current position of the vehicle 13, for example, the controller 31 of the server apparatus 12 calculates the estimated arrival time at the boarding point. The controller 31 then generates a vehicle dispatch response that includes the identification number of the vehicle 13, the current position, the estimated arrival time, the game type of the game provided by the game apparatus 47, and the like. The controller 31 then transmits a vehicle dispatch response to the terminal apparatus 11 via the communication interface 33. The controller 21 of the terminal apparatus 11 receives the vehicle dispatch response via the communication interface 23.

In step S612, the terminal apparatus 11 outputs the vehicle dispatch response to the user. The controller 21 of the terminal apparatus 11 displays the vehicle dispatch response to the user via the output interface 36. For example, the current position of the vehicle 13, the estimated arrival time of the vehicle 13 to the boarding point, the game that can be played on the game apparatus 47 of the vehicle 13, and the like are displayed together with character information such as "vehicle dispatched". When the vehicle 13 arrives at the boarding point, the user boards the vehicle 13.

After the users boards, the vehicle 13 begins traveling toward the drop-off point in step S614.

In step S616, the user plays a game using the game apparatus 47 of the vehicle 13. When the user operates the game apparatus 47 to provide an instruction to start the game in the vehicle 13, the game apparatus 47 responds to the instruction by executing the game program to advance the game. The game to be played may be a stand-alone game or an online game that progresses during communication with any other appropriate game apparatus or terminal apparatus via the communication interface 43.

In step S618, the vehicle 13 transmits the progress information of the game to the server apparatus 12 at any appropriate period (for example, a period of several seconds to several tens of seconds). The in-vehicle apparatus 40 generates progress information corresponding to the progress of the game on the game apparatus 47 and transmits the progress information to the server apparatus 12 via the communication interface 43. The controller 31 of the server apparatus 12 receives the progress information via the communication interface 33.

In step S620, the server apparatus 12 generates an operation adjustment instruction. The controller 31 of the server apparatus 12 calculates the remaining riding time based on the current position of the vehicle 13, the driving speed, and the drop-off point. On the other hand, based on the progress information of the game, the controller 31 calculates the remaining required time until the game ends. When the riding time is shorter than the required time for the game, an operation adjustment instruction is generated for the vehicle 13 to make adjustments such as taking a detour along the travel route and/or reducing the travel speed so that the riding time becomes equal to or greater than the required time for the game. The controller 31 may retrieve a detour route and include information on the detour route in the operation adjustment instruction.

In step S622, the server apparatus 12 transmits the operation adjustment instruction to the vehicle 13. The controller 31 of the server apparatus 12 transmits the operation adjustment instruction to the vehicle 13 via the communication interface 33. The controller 41 of the vehicle 13 receives the operation adjustment instruction via the communication interface 43. The operation adjustment instruction for the vehicle 13 may be generated prior to or at the start of operation of the vehicle 13, based on the riding time for the travel route and the standard required time for the game provided by the game apparatus 47, and then transmitted/received.

In step S624, the vehicle 13 adjusts the operation. The controller 41 of the in-vehicle apparatus 40 controls operations of the vehicle 13 to change the route or the driving speed in accordance with the operation adjustment instruction.

As described above, the user can play the preferred game even while in transit. Since the operation of the vehicle 13 is adjusted according to the riding time to the drop-off point and the required time to the end of the game, the user can end the game before arriving at the drop-off point and avoid needing to get out of the vehicle in the middle of the game. This can improve convenience for users with a preference for games.

Figure 8A:
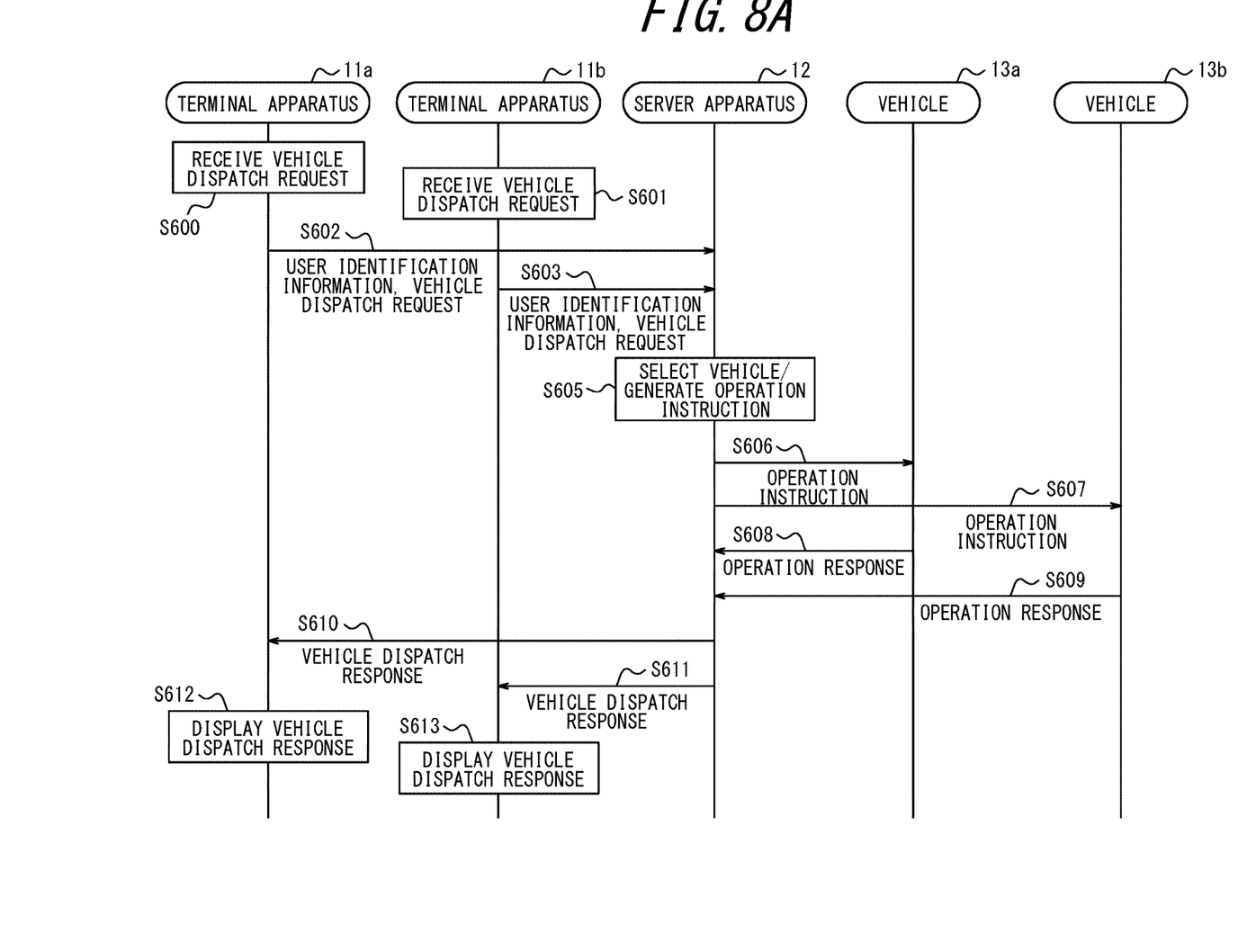
FIG. 8A is a sequence diagram illustrating an operation example of the information system.
Figure 8B:
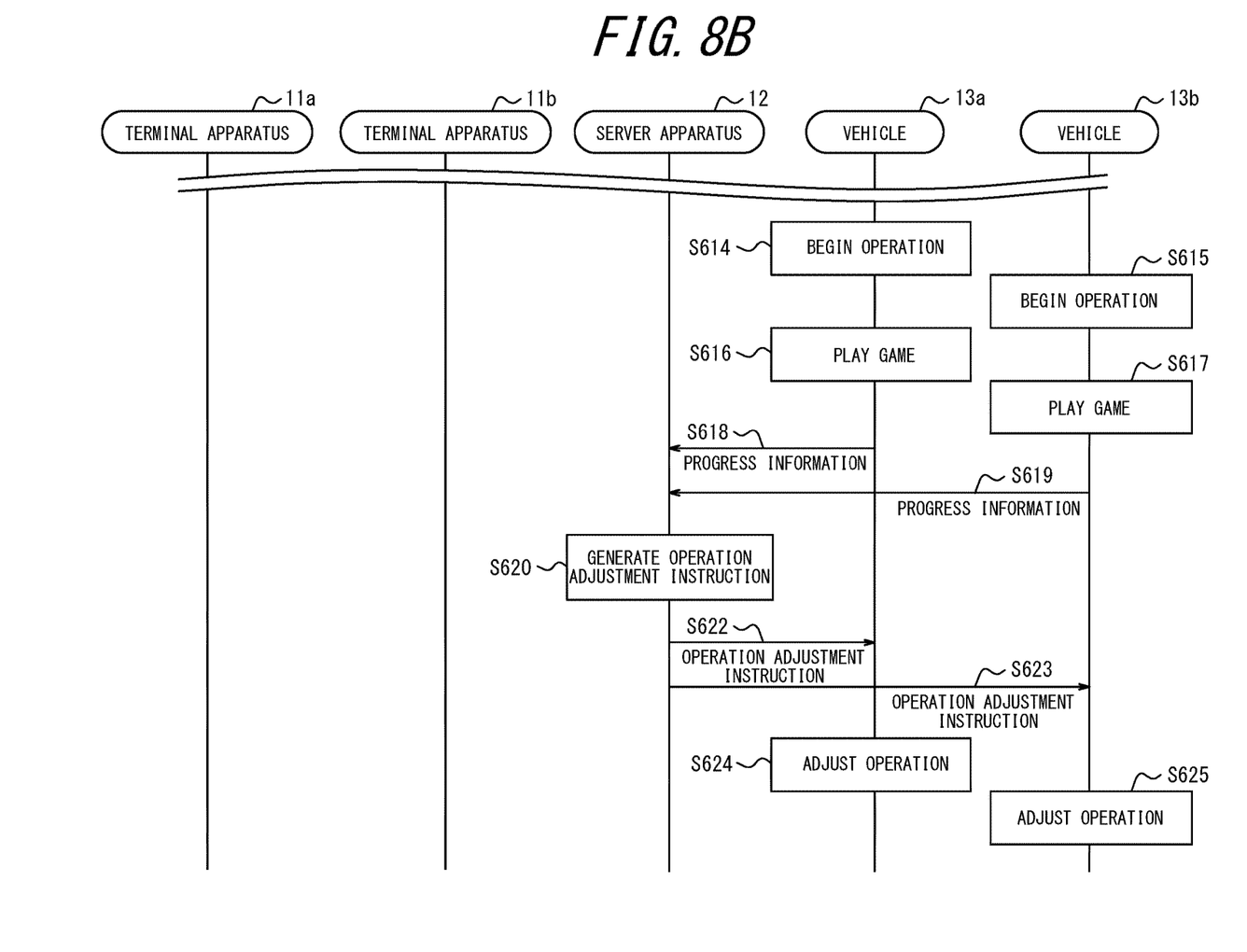
FIG. 8B is a sequence diagram illustrating an operation example of the information system.

FIGS. 8A and 8B are sequence diagrams illustrating operation procedures when the terminal apparatus 11, the server apparatus 12, and the vehicle 13 operate in conjunction with each other in a modification. The procedures of FIGS. 8A and 8B are executed when each user among a plurality of users sharing common preferences for games utilizes a vehicle dispatch service with the terminal apparatus 11. Here, the terminal apparatus 11 used by user A is designated as the terminal apparatus 11a, and the terminal apparatus 11 used by user B is designated as the terminal apparatus 11b. The vehicle 13 used by user A with the terminal apparatus 11a is designated as the vehicle 13a, and the vehicle 13 used by user B with the terminal apparatus 11b is designated as the vehicle 13b. Among the steps executed by the terminal apparatus 11a, the server apparatus 12, and the vehicle 13a in FIGS. 8A and 8B, steps that are the same as those illustrated in FIG. 6 are denoted by the same reference numerals as in FIG. 6, and a description thereof is omitted as appropriate.

In step S600, the terminal apparatus 11a receives a vehicle dispatch request from user A. In step S601, the terminal apparatus 11b receives a vehicle dispatch request from user B, as in step S600.

In step S602, the terminal apparatus 11a transmits identification information of user A and the vehicle dispatch request to the server apparatus 12. In step S603, the terminal apparatus 11b transmits identification information of user B and the vehicle dispatch request to the server apparatus 12, as in step S602.

In step S605, the server apparatus 12 selects a vehicle to be dispatched and generates an operation instruction. The controller 31 of the server apparatus 12 selects dispatchable vehicles 13a and 13b that include game apparatuses 47 corresponding to the respective preferences of user A and user B. The controller 31 retrieves game information 74 that has a game type corresponding to the respective preference information 72 of user A and user B from the memory 32 and identifies pieces of vehicle identification information 73 corresponding to the game information 74. Here, since user A and user B have a common preference for games, pieces of vehicle identification information 73 corresponding to the same game type are identified. The controller 31 then acquires positional information from the vehicles 13a and 13b corresponding to the identified vehicle identification information 73 and confirms whether each vehicle can be dispatched. Based on the boarding point, drop-off point, and the like of user A and user B, the controller 31 then generates an operation instruction, for the selected vehicles 13a, 13b, requesting operation.

In step S606, the server apparatus 12 transmits the operation instruction to the vehicle 13a. In step S607, the server apparatus 12 transmits the operation instruction to the vehicle 13b, as in step S606.

In step S608, the in-vehicle apparatus 40 of the vehicle 13a transmits an operation response to the server apparatus 12 to respond to the operation request. In step S609, the in-vehicle apparatus 40 of the vehicle 13b transmits an operation response to the server apparatus 12 to respond to the operation request, as in step S608.

In step S610, the server apparatus 12 generates a vehicle dispatch response corresponding to the operation response from the vehicle 13a and transmits the vehicle dispatch response to the terminal apparatus 11a. In step S611, the server apparatus 12 generates a vehicle dispatch response corresponding to the operation response from the vehicle 13b and transmits the vehicle dispatch response to the terminal apparatus 11b, as in step S610.

In step S612, the terminal apparatus 11a outputs the vehicle dispatch response to the user. In step S613, the terminal apparatus 11b outputs the vehicle dispatch response to the user, as in step S612.

After the vehicle 13a arrives at the boarding point and user A boards the vehicle 13a, the vehicle 13a begins traveling toward the drop-off point in step S614. After the vehicle 13b arrives at the boarding point and user B boards the vehicle 13b, the vehicle 13b begins traveling toward the drop-off point in step S615, as in step S614.

In step S616, user A plays the game using the game apparatus 47 of the vehicle 13a. In step S617, user B plays the game using the game apparatus 47 of the vehicle 13b. In the vehicles 13a and 13b, users A and B may play a stand-alone game, or users A and B may play an online game together while the vehicles 13a and 13b communicate information with each other. Since the vehicles 13a and 13b corresponding to the common preference of users A and B are dispatched, both users A and B can play the game of their common preference even when in transit.

In step S618, the vehicle 13a transmits progress information of the game to the server apparatus 12 at any appropriate period. In step S619, the vehicle 13b transmits progress information of the game to the server apparatus 12 at any appropriate period, as in step S618.

In step S620, the server apparatus 12 generates operation adjustment instructions. The controller 31 of the server apparatus 12 generates operation adjustment instructions for the vehicles 13a and 13b so that the required time for the game in each of the vehicle 13a and 13b is equal to or less than the riding time. Furthermore, when the vehicles 13a and 13b exchange information and users A and B play an online game jointly, the controller 31 acquires progress information together with information indicating that the online game is being played jointly from the vehicles 13a, 13b and generates the operation adjustment instructions for the vehicles 13a, 13b so that the riding time of both of the vehicles 13a, 13b is equal to or greater than the required time for the jointly played game, more preferably so that the riding time matches between the vehicles 13a, 13b within an appropriate margin of error.

In step S622, the server apparatus 12 transmits the operation adjustment instruction to the vehicle 13a. In step S623, the server apparatus 12 transmits the operation adjustment instruction to the vehicle 13b, as in step S622.

In step S624, the vehicle 13a adjusts the operation in accordance with the operation instruction. In step S625, the vehicle 13b adjusts the operation in accordance with the operation instruction, as in step S624.

As described above, user A and user B can play their preferred game even while in transit. Since the operation of the vehicles 13a, 13b is optimally adjusted according to the riding time to the drop-off point and the required time to the end of the game, both user A and user B can end the game before arriving at the drop-off point and avoid needing to get out of the vehicle in the middle of the game. Convenience can thereby be improved. Furthermore, when the operation of the vehicles 13a and 13b is controlled so that user A and user B end the game at the same time, the user's feeling of satisfaction can be optimized.

In step S605, when the movement routes of the users A and B overlap by any appropriate ratio or greater, and the game apparatus 47 of one vehicle 13 can accommodate both users A and B, the server apparatus 12 may transmit an instruction to pick up user B in addition to the instruction to pick up user A to the vehicle 13a. For example, the controller 31 causes the vehicle 13a to pick up user A and user B when the boarding points and drop-off points of user A and user B are located within any appropriate range of each other. This configuration can optimize the dispatching of the vehicle 13.

In the above embodiment, the processing/control program that defines the operations of the terminal apparatus 11 or the in-vehicle apparatus 40 may be stored on the server apparatus 12 and downloaded to the terminal apparatus 11 or the in-vehicle apparatus 40 via the network 14. Alternatively, the processing/control program may be stored on a non-transitory recording/storage medium, such as a magnetic recording apparatus, an optical disc, a magneto-optical recording medium, or a semiconductor memory that is readable by each apparatus and may then be read by each apparatus from the medium.

The present disclosure is not limited to the above embodiments. For example, a plurality of blocks described in the block diagrams may be integrated, or a block may be divided. Instead of executing a plurality of steps described in the flowcharts in chronological order in accordance with the description, the plurality of steps may be executed in parallel or in a different order according to the processing capability of the apparatus that executes each step, or as required. Other modifications can be made without departing from the spirit of the present disclosure.

The invention claimed is:

1. A server apparatus comprising:
   a communication interface; and
   a controller configured to transmit/receive information to/from another apparatus using the communication interface, wherein
   upon receiving a request for vehicle dispatch from a terminal apparatus, the controller is configured to transmit an instruction to pick up a user of the terminal apparatus to a vehicle that includes a game apparatus corresponding to a game preference of the user,
   upon receiving a request for vehicle dispatch from a terminal apparatus of another user who has the game preference, the controller is configured to transmit an instruction to pick up the another user to another vehicle that includes a game apparatus configured to communicate with the game apparatus of the vehicle, and
   the controller is configured to transmit an instruction to the vehicle and the another vehicle to change respective travel routes or travel speeds so that riding times of respective users of the vehicle and the another vehicle match.

2. The server apparatus of claim 1, wherein the controller is configured to transmit an instruction to the vehicle to change a travel route or a travel speed in accordance with a required time for a game provided by the game apparatus.

3. The server apparatus of claim 1, wherein the controller is configured to receive information on the game preference of the user of the terminal apparatus from the terminal apparatus.

4. A system comprising the server apparatus of claim 1 and the vehicle.

5. An in-vehicle apparatus to be mounted in a vehicle comprising a game apparatus, the in-vehicle apparatus comprising:
   a communication interface; and
   a controller configured to transmit/receive information to/from another apparatus using the communication interface, wherein
   the controller is configured to receive, from a server apparatus configured to receive a request for vehicle dispatch from a terminal apparatus, an instruction to pick up a user of the terminal apparatus when a game preference of the user corresponds to the game apparatus,
   the server apparatus receives a request for vehicle dispatch from a terminal apparatus of another user who has the game preference, the controller is configured to cause the game apparatus to communicate with a game apparatus of another vehicle for which the vehicle dispatch is transmitted, and
   the controller is configured to receive an instruction, from the server apparatus, to change a travel route or a travel speed so that a riding time of the user matches a riding time of a user of the another vehicle.

6. The in-vehicle apparatus of claim 5, wherein the controller is configured to receive an instruction to change the travel route or the travel speed in accordance with a required time for a game provided by the game apparatus.

7. The in-vehicle apparatus of claim 5, wherein when the server apparatus receives the request for vehicle dispatch from the terminal apparatus of the another user who has the game preference, the controller is configured to receive an instruction from the server apparatus to pick up the another user in addition to the user.

8. A vehicle comprising the game apparatus and the in-vehicle apparatus of claim 5.

9. A method of operating a system comprising a server apparatus and a vehicle provided with a game apparatus, the server apparatus and the vehicle being configured to transmit/receive information to/from each other, the method comprising:
   receiving, by the server apparatus, a request for vehicle dispatch from a terminal apparatus and transmitting an instruction to pick up a user of the terminal apparatus when a game preference of the user corresponds to the game apparatus; and
   receiving, by the vehicle, the instruction, wherein
   the server apparatus transmits, upon receiving a request for vehicle dispatch from a terminal apparatus of another user who has the game preference, an instruction to pick up the another user to another vehicle that includes a game apparatus configured to communicate with the game apparatus of the vehicle,
   the vehicle communicates with the another vehicle,
   the server apparatus transmits an instruction to the vehicle and the another vehicle to change respective travel routes or travel speeds so that riding times of users of the vehicle and the another vehicle match, and
   the vehicle receives the instruction.

10. The method of operating a system of claim 9, wherein
   the server apparatus transmits an instruction to change a travel route or a travel speed in accordance with a required time for a game provided by the vehicle, and
   the vehicle receives the instruction.

11. The method of operating a system of claim 9, wherein the server apparatus receives information on the game preference of the user of the terminal apparatus from the terminal apparatus.

* * * * *